July 6, 1926.
M. SCHWARTZ
FASTENING MEANS
Filed April 21, 1924
1,591,057
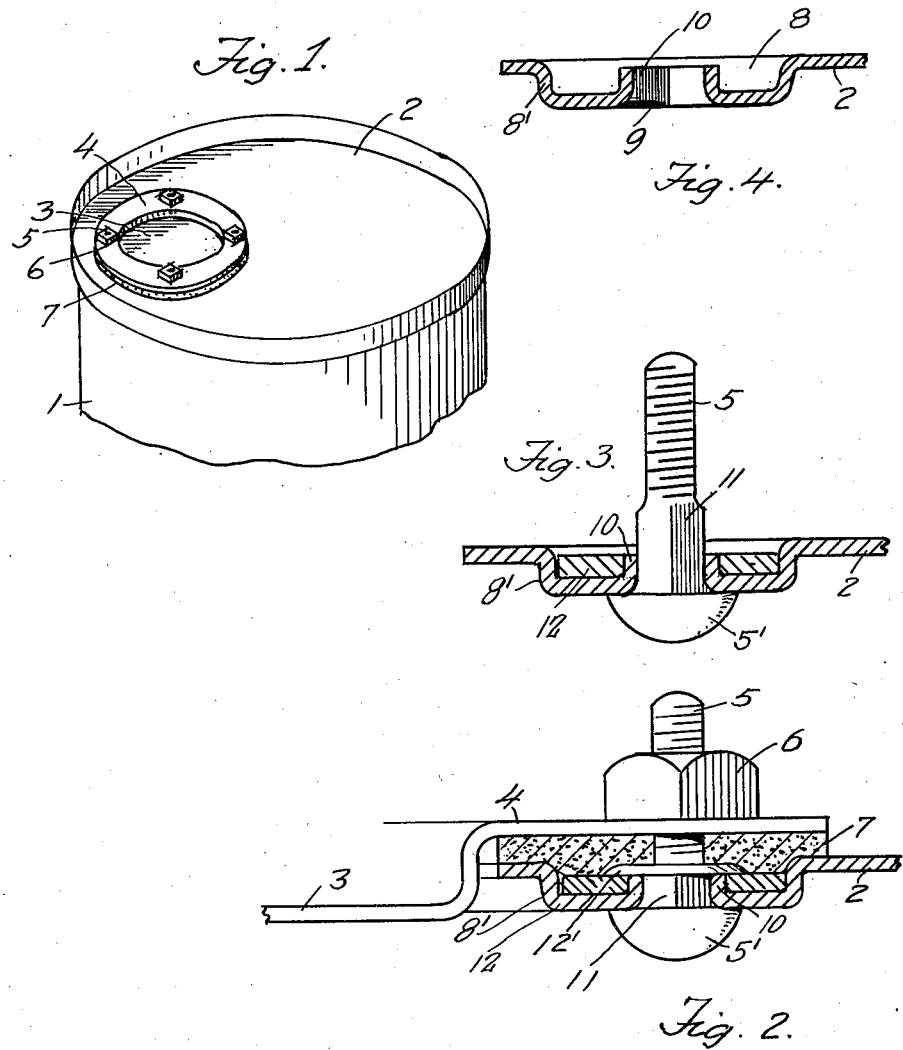
INVENTOR:
Morris Schwartz.
BY: Oliver O. Martin
HIS ATTORNEY.

Patented July 6, 1926.

1,591,057

UNITED STATES PATENT OFFICE.

MORRIS SCHWARTZ, OF CHICAGO, ILLINOIS, ASSIGNOR TO AMERICAN FLANGE & MANUFACTURING CO., OF CHICAGO, ILLINOIS, A CORPORATION OF ILLINOIS.

FASTENING MEANS.

Application filed April 21, 1924. Serial No. 707,979.

My invention relates to fastening means, the device of my invention being especially useful in fastening closures upon steel barrels and the like, but the invention is not to be thus limited.

My invention comprises a sheet member, such as a barrel closure, which is formed with an opening therethrough and which is angularly continued at said opening to form a socket, and a bolt passing through said socket, the bolt and socket having engaging portions at unequal distances from the axis of the bolt to prevent the bolt from turning, said bolt having two enlargements between which said socket is confined.

In the drawing,

Fig. 1 is a fragmentary view of the end of a steel barrel embodying the invention.

Figs. 2, 3 and 4 are substantially full size views of portions of the closing means illustrated in Fig. 1.

The numeral 1 denotes a steel barrel, in which a head 2, formed of a sheet of metal, is suitably fastened. In this head is cut an orifice closed by a circular cover or closure 3 made with an annular flange 4. In the head 2 is fastened a plurality of threaded studs 5, which extend through perforations in the annular flange 4, and upon which are mounted suitable nuts 6. An annular gasket 7 is placed between the cover flange and the barrel head for the purpose of effecting a tight joint.

At the points where the bolts 5 extend through the head are provided circular depressions 8, in the center of each of which is made a square opening 9, the edge portions of which are extruded or continued angularly to the sheet member 2 to form a square socket 10 of a size to fit the square shank or stem portion 11 of the bolt 5. The engaging portions of the socket 10 and bolt shank are thus at unequal distances from the axis of the bolt so that the bolt is held from turning. In the annular space within the depression 8 is placed a circular disc or ring 12, and this disc or ring is made with a square central opening which fits snugly around the square socket 10. When the bolt has been put in place, in the first instance, the parts are taken to a punching machine provided with a tubular punch the perforation of which fits the threaded portion of the bolt. This punch is caused to surround and descend along said threaded portion until it reaches the enlarged square shank 11, and as it then continues to descend it cuts this oversize portion away from the bolt and squashes it down upon the disc 12, producing a flange or enlargement substantially as indicated at 12' in Fig. 2, this flange cooperating with the bolt head or enlargement in locking the bolt tightly in position, the socket 10 and ring 12 being confined between the bolt enlargement 5', 12'. The ring 12 sufficiently fits the wall 8', of member 2, that surrounds the socket 10, as well as sufficiently fitting the socket so that the proper angularity of the socket to the body of the sheet member 2 is not disturbed when the flange 12' is swaged. It is obvious that the socket and bolt may be otherwise shaped to provide engaging portions at unequal distances from the bolt axis to prevent the bolt from turning.

To those versed in the art it is known that bolts are used in steel barrels for the purpose specified, and it is also known what difficulties usually are encountered in connection with such structures. These difficulties I overcome by means of my improved device, as I shall now point out. It is noticed, and has hereinbefore been stated, that the disc 12 fits tightly around the protruding edges 10 of the square bolt perforations. Let it be assumed that this disc is omitted, let the bolt be placed in position, and let the enlarged square portion of the bolt be rolled down upon this projecting socket 10. It will be found that the walls of the socket are in danger of spreading and crumbling under the pressure of the descending metal with the result that the bolt, while sufficiently tied to the barrel, may not be securely held circumferentially, and that it may work loose enough to turn when the nut is screwed into place or unscrewed. Furthermore the bolt may be set at an angle, due to the aforesaid spreading and crumbling of the socket, making it more difficult to set the cover, or barrel head, in place on the bolts, when they are more or less out of line with the holes in the cover and gasket.

Now, it is noticed that the disc fits tightly around the edges 10, that it is substantially as thick as the projected height of said edges, and that it is large enough in diameter to support the said edges against spreading and crumbling. As a consequence the bolt is solidly and squarely set, and the metal of the barrel head 2 is reinforced by the disc, so that a permanent and reliable structure is provided.

I claim:

1. The combination with a sheet member formed with an opening therethrough and angularly continued at said opening to form a socket and having a wall portion surrounding and spaced from said socket; of a bolt passing through said socket, the bolt and socket having engaging portions at unequal distances from the axis of the bolt to prevent the bolt from turning; and a ring surrounding said socket and surrounded by said wall portion and fitting said socket and wall portion, said bolt having two enlargements between which said socket and ring are confined.

2. The combination with a sheet member formed with an opening therethrough and angularly continued at said opening to form a socket; of a bolt passing through said socket, the bolt and socket having engaging portions at unequal distances from the axis of the bolt to prevent the bolt from turning, said bolt having two enlargements between which said socket is confined.

In testimony whereof I have hereunto affixed my signature.

MORRIS SCHWARTZ.